(12) United States Patent
Fent et al.

(10) Patent No.: US 6,581,589 B1
(45) Date of Patent: Jun. 24, 2003

(54) SOLAR CELL WITH A SOLAR COLLECTOR AND STORAGE ELEMENTS

(75) Inventors: Giuseppe Fent, Grubstrasse 13, CH-9519 Hosenruck (CH); Jan Richard De Fries, Wallisellen (CH)

(73) Assignee: Giuseppe Fent, Will (CH)

( * ) Notice: Subject to any disclaimer, the term of this patent is extended or adjusted under 35 U.S.C. 154(b) by 0 days.

(21) Appl. No.: 09/673,767

(22) PCT Filed: Apr. 20, 1999

(86) PCT No.: PCT/CH99/00158

§ 371 (c)(1),
(2), (4) Date: Oct. 18, 2000

(87) PCT Pub. No.: WO99/54669

PCT Pub. Date: Oct. 28, 1999

(30) Foreign Application Priority Data

Apr. 20, 1998 (EP) .............................. 98810343

(51) Int. Cl.$^7$ .................................... F24J 2/04
(52) U.S. Cl. .................. 126/617; 126/618; 126/400; 126/714
(58) Field of Search ................ 126/714, 617, 126/400, 618, 620, 621, 622, 569, 619

(56) References Cited

U.S. PATENT DOCUMENTS

| 2,625,930 | A | * | 1/1953 | Harris | .......................... 126/618 |
| 2,671,441 | A | * | 3/1954 | Harris | .......................... 126/569 |
| 3,018,087 | A | * | 1/1962 | Steele | .......................... 126/569 |
| 3,735,806 | A | * | 5/1973 | Kirkpatrick | ............ 165/104.14 |
| 3,987,786 | A | * | 10/1976 | Keyes et al. | ................. 126/400 |
| 4,018,211 | A | * | 4/1977 | Barr | .......................... 126/621 |
| 4,088,117 | A | * | 5/1978 | Keyes | .......................... 126/658 |
| 4,088,266 | A | * | 5/1978 | Keyes | .......................... 126/400 |
| 4,186,722 | A | * | 2/1980 | Muessig | .................... 126/400 |
| 4,286,420 | A | * | 9/1981 | Pharmakidis | ............... 126/617 |
| 4,572,864 | A | * | 2/1986 | Benson et al. | ................ 252/70 |
| 4,596,237 | A |   | 6/1986 | Melchior et al. | |
| 4,715,358 | A | * | 12/1987 | Koster | ........................ 126/629 |
| 5,092,101 | A | * | 3/1992 | Kunert | ....................... 156/100 |
| 5,217,000 | A | * | 6/1993 | Pierce-Bjorklund | ......... 126/621 |
| 5,497,762 | A | * | 3/1996 | Rylewski | .................... 126/624 |
| 5,626,936 | A | * | 5/1997 | Alderman | ................... 126/618 |
| 5,680,734 | A | * | 10/1997 | Magee | ........................ 126/685 |
| 5,931,157 | A | * | 8/1999 | Aschauer | .................... 126/621 |

FOREIGN PATENT DOCUMENTS

| AT | 375 125 B |   | 7/1984 | |
| CH | 613 764 | * | 10/1979 | ................. 126/617 |
| DE | 30 23 714 A |   | 1/1982 | |
| FR | 2534006 | * | 4/1984 | ................. 126/693 |
| GB | 15556434 | * | 11/1979 | ................. 126/667 |
| JP | 57-210243 | * | 12/1982 | |
| WO | WO 87/00607 | * | 1/1987 | |

* cited by examiner

*Primary Examiner*—Carl D. Price
(74) *Attorney, Agent, or Firm*—Schweitzer Cornman Gross & Bondell LLP

(57) ABSTRACT

Heat insulations in houses having card-board lattice arranged behind a glass pane yield, in practice, a heat flow which is dependent on insolation. Said heat flow is lower at night and during weak insolation and begins to increase when the lattice is solar heated. The inventive solar cell (1) comprises a lattice (5) which is situated behind a rear-ventilated glass pane (2) and which exhibits durable storage properties. The solar cells characterize a solar energy yield (v') by an arrangement which selects for an angle of incidence. Said solar energy yield does not lead to overheating in the room interior (R) also when the sun is at a high position. A thermal time constant is obtained by means of heat insulations (11, 12, 13) which are connected in succession. Said time constant guarantees comfortable temperatures in the interior (R) of the house also in the case of low supplementary heating. The solar cell (1) considerably reduces heat requirements and can be optimally adapted to a wide range of local climate relationships.

24 Claims, 13 Drawing Sheets

SOLAR CELL WITH A SOLAR COLLECTOR AND STORAGE ELEMENTS

The invention relates to a solar cell.

Background of the Invention

U.S. Pat. No. 4,596,237 discloses a solar cell for obtaining transportable thermal energy. The cell has swivelling, slatted shading elements on the outside and/or a coating applied to the outer transparent cover, which limit the maximum incident thermal radiation. The energy taken up is transferred via subsequent absorber layers to a plurality of encapsulated latent heat stores which store the heat chemically and release it again to the adjacent rooms with a time delay on cooling, by resulting recrystallizations.

An air cushion forms between the heat stores, which are arranged opposite one another and are tightly sealed on all sides; only a very limited heat transfer can take place, so that the losses resulting from cooling are very high, which means that only a low heat flow to the inside of the building takes place with a relatively short time delay. A perceptible day/night compensation is therefore not possible due to the system. The solar converter containing chemicals is furthermore very expensive to produce and, depending on the storage medium used, is even an envimomental hazard and requires special disposal measures on later replacement or breakage.

A low-energy house with a honeycomb structure which absorbs radiant heat is known (Felix Schmid, Wärmedämmung mit Karton, Schweizer Energie-Fachbuch [Heat Insulation with Cardboard, Swiss Energy Textbook] 1988, Verlag Künzier-Bachmann AG, CH-9001 St. Gallen, p. 50–51). This structure comprises solar cells which are employed with a front glazing in elemental construction to build up a wall 30 to 40 cm thick. A wooden frame contains a conventional heat insulation and a cardboard honeycomb 8 cm thick positioned in front, which are protected by the rear-ventilated low-reflection glazing. The cardboard honeycomb acting as a solar collector reduces the temperature gradient in the outer skin of the house and minimizes the heat flow from the inside outwards. However, the actual energy gain is relatively small even on sunny days, since the solar radiation into the horizontal honeycombs made of recycled paper covers only the lower front region thereof and passes into the inside only by means of low thermal convection. The thermal time constant of the material used is inadequate per se and is intensified in its negative effect by the structure-related poor longitudinal conductivity of the honeycombs, which furthermore have channels with an approximately circular cross-section and a constant width.

In practical operation it has been found that on sunny days temperatures of up to more than 90° C. partly arise on the cardboard honeycomb, while on a cloudy winter day −3° C. was measured at the same point. These high temperature gradients result in an accelerated ageing of the honeycomb material, the swelling properties thereof inter alia undergoing reversible deterioration.

AT-B-375 125 discloses an insulating façade which has a stationary structure for shading, but its use is limited to south-side façades. By horizontal channels closed on both sides in the insulating material, a direct introduction of thermal radition into the building is said to take place in the winter months. However, no storage of heat and also no time-delayed introduction of heat into the inside of the building is possible by this means. The necessary high number of channels causes high insulation losses, which has a particularly adverse effect if the temperature difference between the inside of the building and outside is high, i.e. in the absence of solar radiation and in particular in the late hours of the night.

Brief Summary of the Invention

The object of the present invention is therefore to provide a solar cell which does not have the abovementioned disadvantages and nevertheless has good summer/winter properties. The solar cell should achieve a temperature course in the house which is as balanced as possible, regardless of the height of the sun; allow a so-called comfort climate there, and in winter effect a noticeable solar heat gain. The solar cells must be aesthetically pleasing and it must be possible to integrate them both into new buildings and into existing structures, at least in a visually acceptable manner. The solar cell must be adaptable to the local circumstances of vapour diffusion (formation of dew). The structure thereof should also allow integration and/or combination with self-supporting structural elements known per se.

The materials used for the construction must moreover be biologically acceptable in building terms and as close to natural as possible; they should largely comply with the conditions of lasting construction.(according to the Brundtland Commission) and nevertheless be economical and maintenance-free. In particular, no expensive latent heat stores based on recrystallizations should be used in order to achieve the desired thermal time constant.

In accordance with the foregoing, a solar cell of the present invention includes a solar collector with a transparent, rear ventilated, cover. A stationery honeycomb structure for solar radiant heat absorption is at a geometry selected for the incident angle of the radiation, either with or without a front structure to further compensate for seasonal angle variations.

The term "selective for the incident angle" as used herein relates here to geometries and structures in and on honeycombs which, compared with those with only channels which are of uniform shape or slightly widened on the solar side, result in a better limiting of the summertime heating up temperatures and considerably reduce the heating requirement in winter.

In practice this means that only direct thermal radiation at an angle of >60° to the perpendicular enters into the collector.

An embodiment of the solar cell which is open to vapour diffusion is important, which on the one hand serves for good transportation of heat in the day and night phases, and on the other hand prevents the formation of dew on separating layers. This embodiment can be implemented on the building object according to the sky direction and to geographical and local incident radiation circumstances.

The thermal time constant, calculated by conventional methods or determined and/or verified by experiments, is likewise adapted to the local circumstances and must guarantee a heat gain in the rooms lying behind during the night hours and delayed heating thereof during the day. In practice this leads to a reduction in the temperature gradient between the inside and outside on the building jacket.

When designing the insulation, because of obligatory building and energy regulations it is of course also necessary to reach compromises, which in physical terms often would not be necessary per se, since the invention relates to an active, self-regulating thermal system.

A volume ratio between the hollow spaces and closed volume of the honeycomb of <4:1 regardless of the density of the material, results in a higher thermal capacity compared with the known cardboard honeycombs and therefore better storage properties.

The integration of mirrors to compensate for seasonal incident angle variation allows improved directing of the incident solar radiation. In the simplest case flat mirrors are used, these being assigned to the honeycomb openings, for example, as metal strips. A specific orientation of the mirrors adjusted to requirements in respect of the alignment of the wall surface or of the roof and the geographical position is particularly advantageous. The mirrors can also be of a bifocal construction.

By constructing the honeycomb with hollow spaces having larger dimensions in the direction of sun height as compared to an orthogonal direction, a higher introduction of energy can be achieved, so that rooms lying behind can be employed for drying numerous materials, or this type of solar cell can also be used in combination with heat exchangers for heating water or assisting heating. Such an arrangement may be appropriate in the roof area, where the highest energy yield is to be expected, corresponding to the inclination, which can be freely chosen within wide limits. Preheating of air in mechanical domestic ventilation systems and air-conditioning units can also be realized by means of simple cross-current heat exchangers.

Shading elements can be employed, and are particularly efficient in summer months and, with a size which is easy to optimize, do not interfere or interfere only slightly with the incident radiation in winter months.

By targeted structuring of the hollow spaces in the honeycomb, the heat absorption can be improved. By tapering or narrowing the hollow spaces in the inward direction the solar yield can be further increased or optimized. Inclined hollow results in an improved introduction of heat especially if the hollow spaces are not completely air-tight on the side of the heat insulation.

A transparent film may be employed for suppressing a backflow of heat caused by transportation of air in the region of the rear ventilation. The radiation yield is particularly efficient with use of a black radiation emitter film. The incorporation of further heat insulations in the honeycomb openings represents an expedient alternative to the films.

By the additional incorporation of known latent heat stores which release again during the night the heat excess present during the day, and on the other hand by so-called "heat tubes", which transport the heat of evaporation from a first to a second zone and have the effect of a high heat insulation from the second to the first zone, the solar cell according to the invention may be further optimized.

Due to the high mass and the storage capacity which can thereby be chosen, a fine ceramic is particularly advantageous for the honeycomb, especially since this can be partly metal-coated economically favourably by glazes. Wood with a high hygroscopicity, results in a construction which is particularly close to natural and requires only little so called "grey" energy.

The utilization of a transparent cover having a structured outer surface known per se which, without noticeable losses in energy transportation, generates iridescent light reflexes, depending on the height of the sun, can also be efficiently incorporated into the invention.

BRIEF DESCRIPTION OF THE DRAWINGS

Embodiment examples of the subject matter of the invention are described below by way of example with the aid of drawings. In all the figures the same functional components are given the same reference numerals.

In the drawings:

FIG. 2b shows a part view on the honeycombs in the solar cell FIG. 2a;

In all the figures, the same functional components have been given the same reference numbers.

DETAILED DESCRIPTION OF THE INVENTION

On a building shell, solar cells are designated 1, of which only the structured glass panes 2 and frames 3, which are known per se, are visible. An angle range $\phi 1$, which indicates the angle of incidence of solar electromagnetic radiation during the summer, and an angle range $\phi 2$, which indicates the angle of incidence of diffuse radiation and the solar radiation which prevails in winter at a low height of the sun, and the perpendicular L have also been drawn in. The conventional components, which are not described in more detail, are shown in shaded form.

Figure 1:
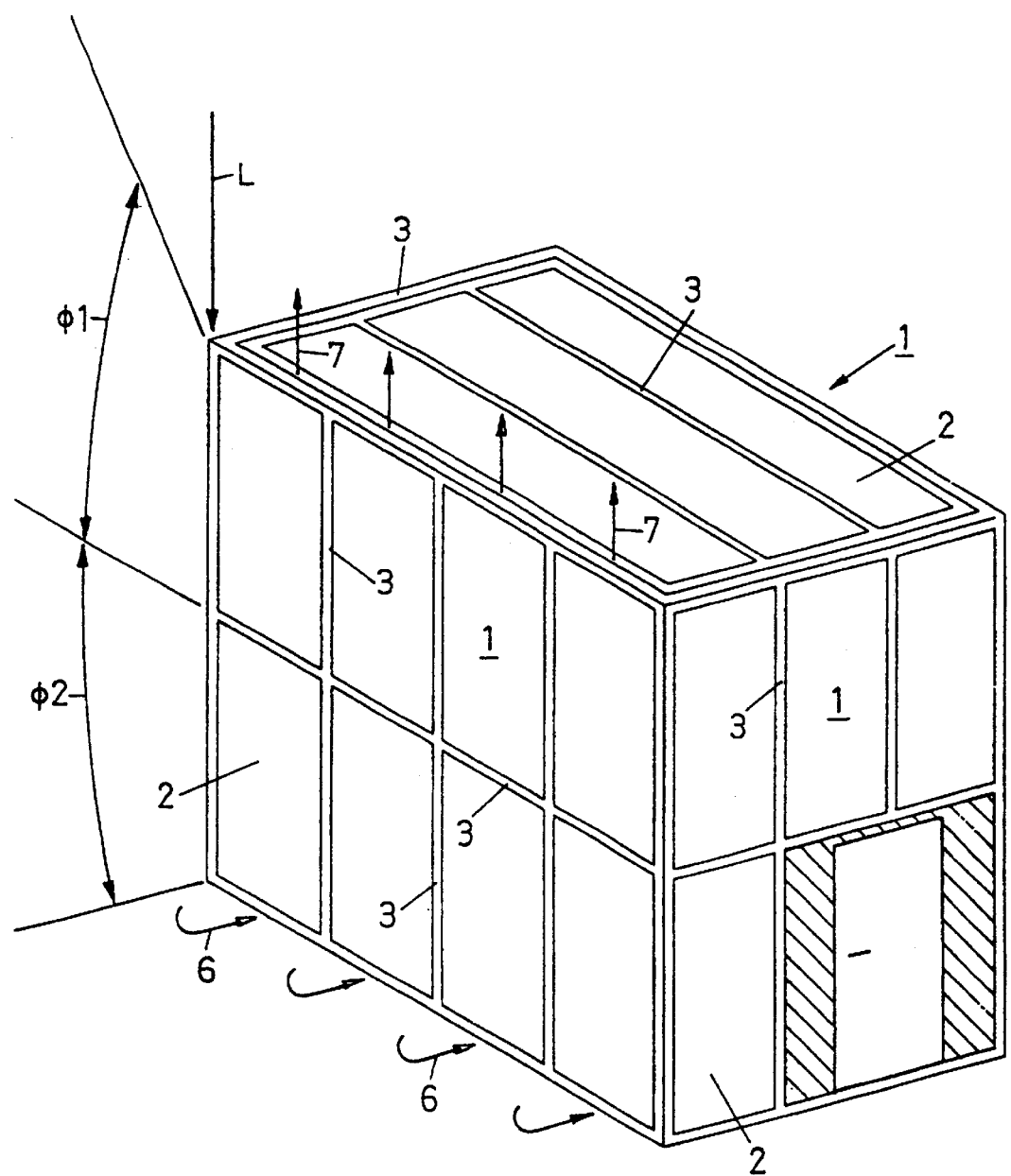
FIG. 1 shows a simplified building shell with solar cells in the wall and roof region, glass panes thereof being seen.
Figure 2A:
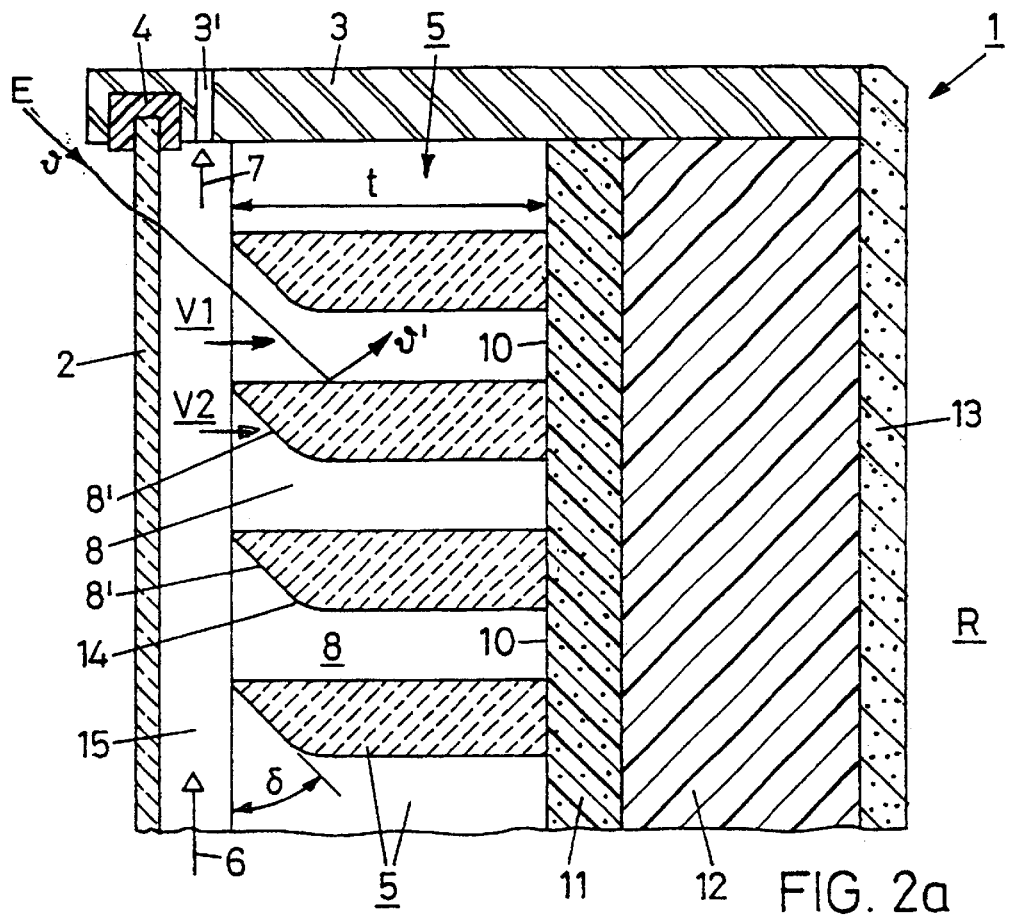
FIG. 2a shows a section through a solar cell from FIG. 1.

The section of the solar cell 1, FIG. 2a, shows the typical construction thereof, with the glass pane 2 (dimensions: 0.9 m×1.8 m) on the front side. A surrounding frame 3 of impregnated wood with vertical bores 3' accommodates a commercially available seal 4 and holds the glass pane 2 without stress. Set back by an air gap 15 for rear ventilation is a honeycomb 5, the actual solar collector. The intake air flow established is designated 6 and the exit air flow 7. The honeycomb 5 is made of fine ceramic and has rectangular openings 8 with slanting surfaces 8' widening The openings 8. The honeycomb structure 8 has a volume ratio V of V1 (openings) to V2 (closed volume) of 0.8 to 1.0 and thus has an already considerable inherent storage mass.

The radiation v of the solar energy E is deflected inwards in the glass pane 2 in a known manner according to the density of the glass and arrives, parallel to the slanting surface 8', in the hollow space 8 and is directed into the inside as partly reflected radiation v' and is largely absorbed by the mass of the honeycomb 5, i.e. the honeycomb is loaded thermally. A subsequent first heat insulation 11 is additionally charged via through-openings 10 in the honeycomb 5 through a weak flow of warm air and removes the air from the honeycombs via its porous structure, thereby taking up the air's heat. The adjacent second heat insulation 12 serves chiefly to suppress an outflow of heat from the room interior R to the outside and has a corresponding k value. A further layer comprises a gypsum plate 13 which serves the room R in the usual manner as a humidity store and for humidity compensation during variations in temperature.

The mode of action of the solar cell 1 is accordingly largely based on a reduction in the temperature gradient from the outside towards the room interior R. The time-delayed effect of the cell 1 arises due to the slow thermal loading of the mass of the honeycomb structure 5 and the delayed outflow of heat through the layers of the heat insulations 11 to 13, so that de facto the cell 1 scarcely cools in the night hours and the temperatures in the room interior R thus also fall by only a few degrees Celsius without additional heating. The resulting maintaining of a high surface temperature on the inside walls, which results from the radiant heat and which is known to be a prerequisite for the comfort climate sought, is of particular physiological benefit.

Figure 2B:
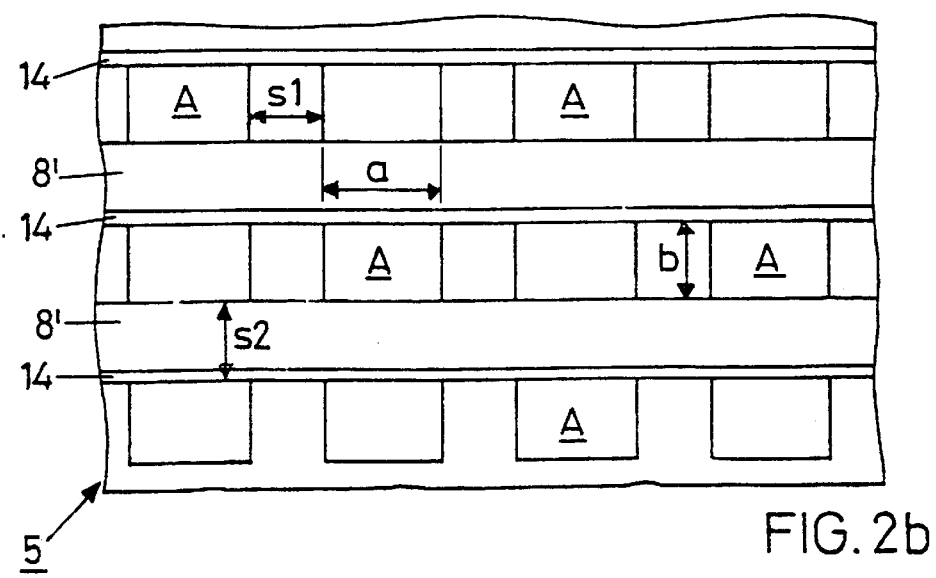

The active portion of the honeycomb structure 5 can be seen from the frontal view in FIG. 2b. This shows rectangular apertures A thereof with a horizontal width "a" and a vertical width "b" and the continuous slanting surfaces 8' and the similarly continuous curves 14, which together form the structure selective for the incident angle for the radiation v. The width "a" of the honeycomb openings 8 here is 14 mm, and the vertical width is 10 mm; the horizontal wall s1 between the openings spaces is 8 mm thick, and the vertical wall s2 is 10 mm, the walls being slightly bezeled. The depth t, FIG. 2a, of the honeycomb 5 measures 50 mm, while the angle of inclination δ of the large slanting surfaces 8' forms an angle of 45° with the perpendicular.

The part section of FIG. 3 again shows a glass pane 2, this time with a film 16 on its interior surface, which acts as a frequency filter which passes short-wavelength solar radiation and reflects the longer-wavelength interior thermal radiation which is at a lower level.

Flows 6 and 7, which are necessary for the rear ventilation, in turn form behind the glass pane 2, and behind these is arranged the honeycomb structure 5 which has hollow spaces 8 in pocket hole form slanting downwardly at an angle α, with corresponding rear walls 9.

Figure 3:
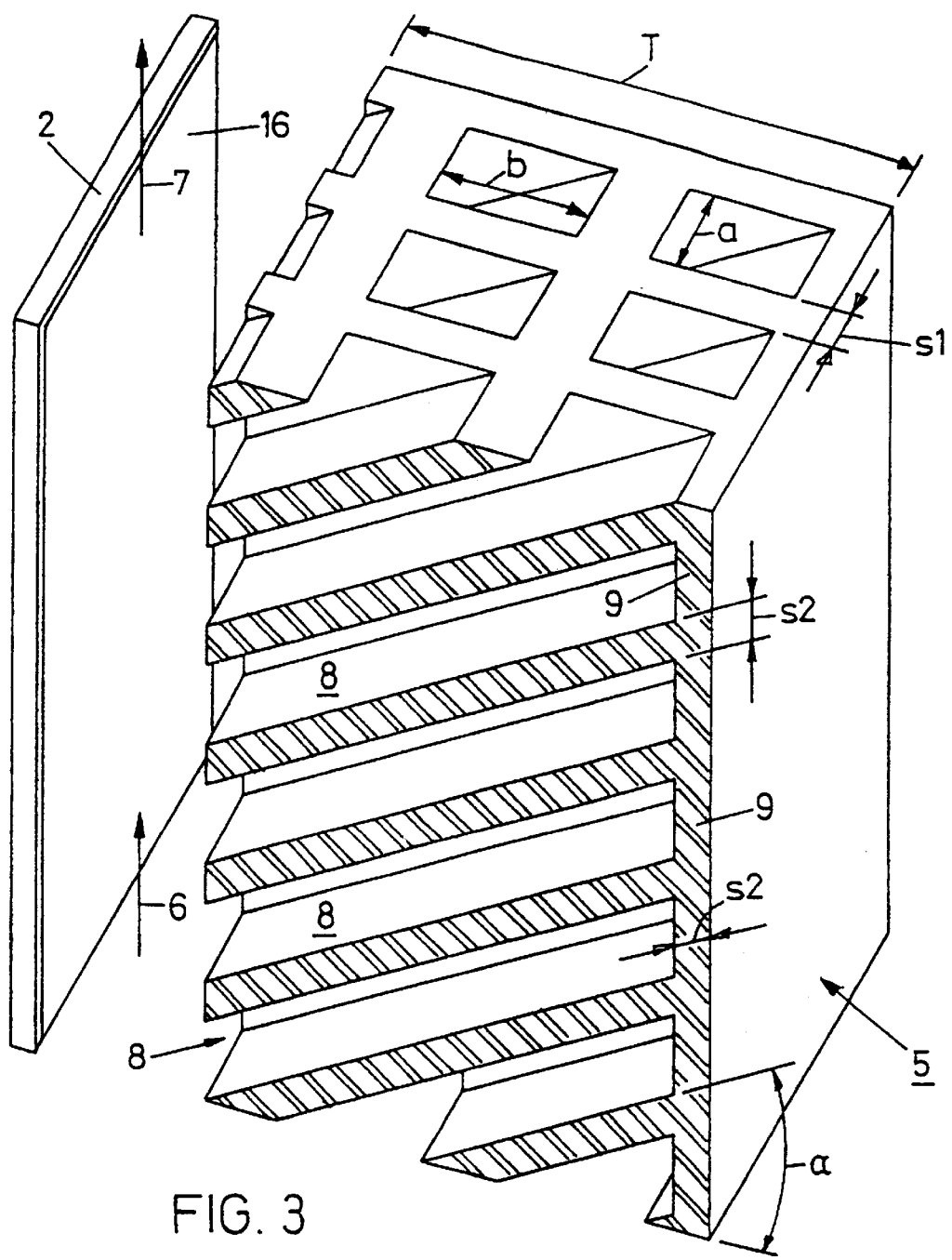
FIG. 3 shows a variant of a solar cell with slanting hollow spaces, in simplified form.

The honeycomb 5 as shown in FIG. 3 is made of coarse-fibre laminated wood through which diffusion can take place, and has only thin walls. The widths a=b are 8 mm; the walls s1 and s2 are 10 mm thick. The depth T of the honeycomb 5 is 80 mm. The angle α is 30°; the distance between the glass pane 2 and the honeycomb 5 is 25 mm. The film 16 is made of polyethylene terephthalate and is commercially obtainable.

This honeycomb 5 also has a thermal storage volume, which is substantially determined by the water content of the wood and less by the mass thereof; volume ratios V between the hollow spaces 8 and the closed honeycomb structure of less than the factor 4 have proved appropriate.

The slanting hollow spaces 8 result in a very desirable thermal layering, and in larger and smooth hollow spaces for a circulation of the enclosed air, and thereby assist the heat exchange.

Figure 4:
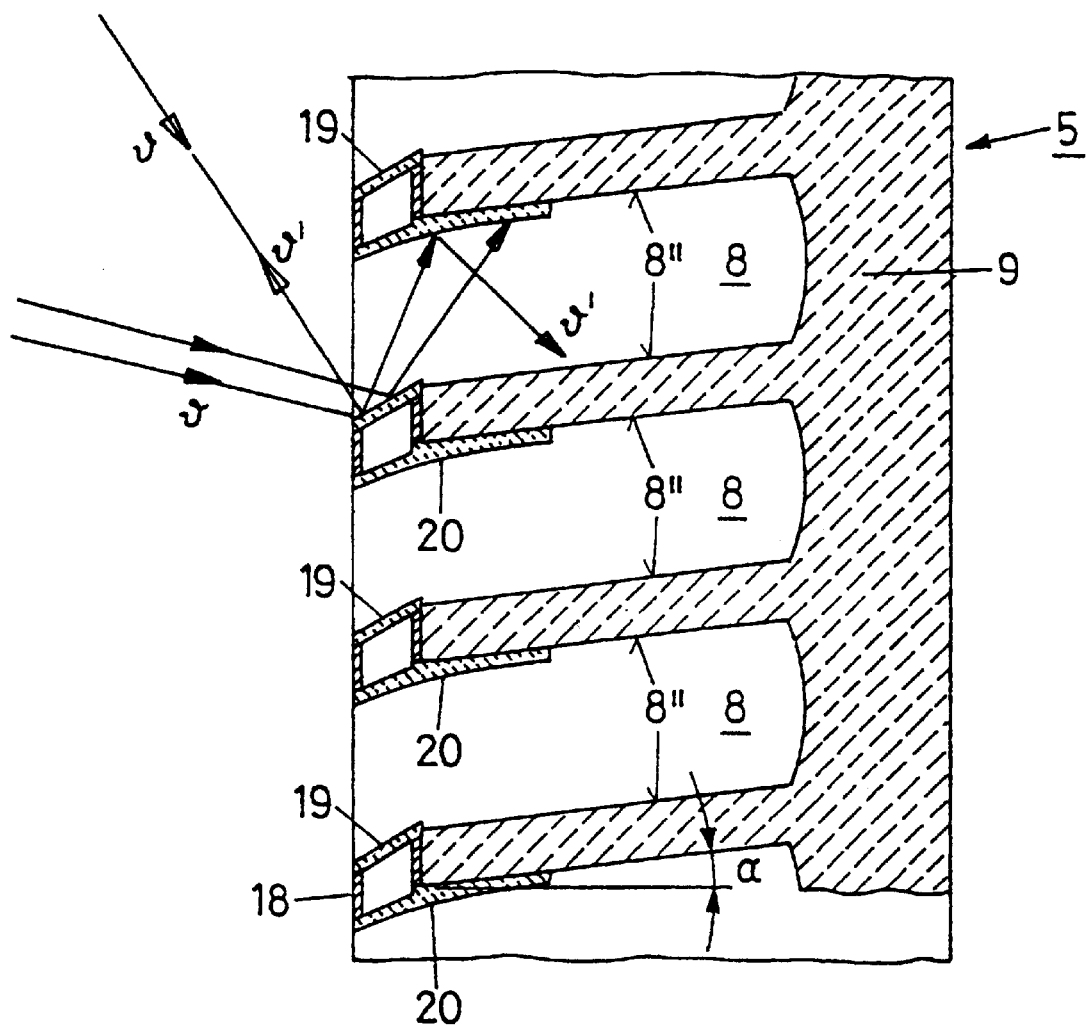
FIG. 4 shows a second variant of an embodiment of a honeycomb with flat mirrors and parabolic mirrors.

FIG. 4 shows a further honeycomb structure 5 of fine ceramic, which in turn has hollow spaces 8 slanting downwardly at an angle α of 15°. Here, however, the front parts are constructed reflectively by means of adhered metallic reflectors 18, a polished flat mirror 19 inclined at 45° being provided on the lower-side of each hollow space 8, and a spherical mirror 20 in each case being provided on the upper side. The hollow spaces 8 have an open-pore rough structure.

The ray paths drawn in the upper part in FIG. 4 show the mode of action of the mirrors 19 and 20. A ray v incident at a high summer sun height is reflected directly back by the flat mirror, while more obliquely incident rays v reflect to the upper spherical mirror, are directed into the inside of the hollow space 8 as rays v' and are absorbed there by the rough surface 8" and converted into heat. The rear wall 9 has a relatively large storage mass, so that the system shows not only an energy gain but also a high storage capacity.

Figure 5:
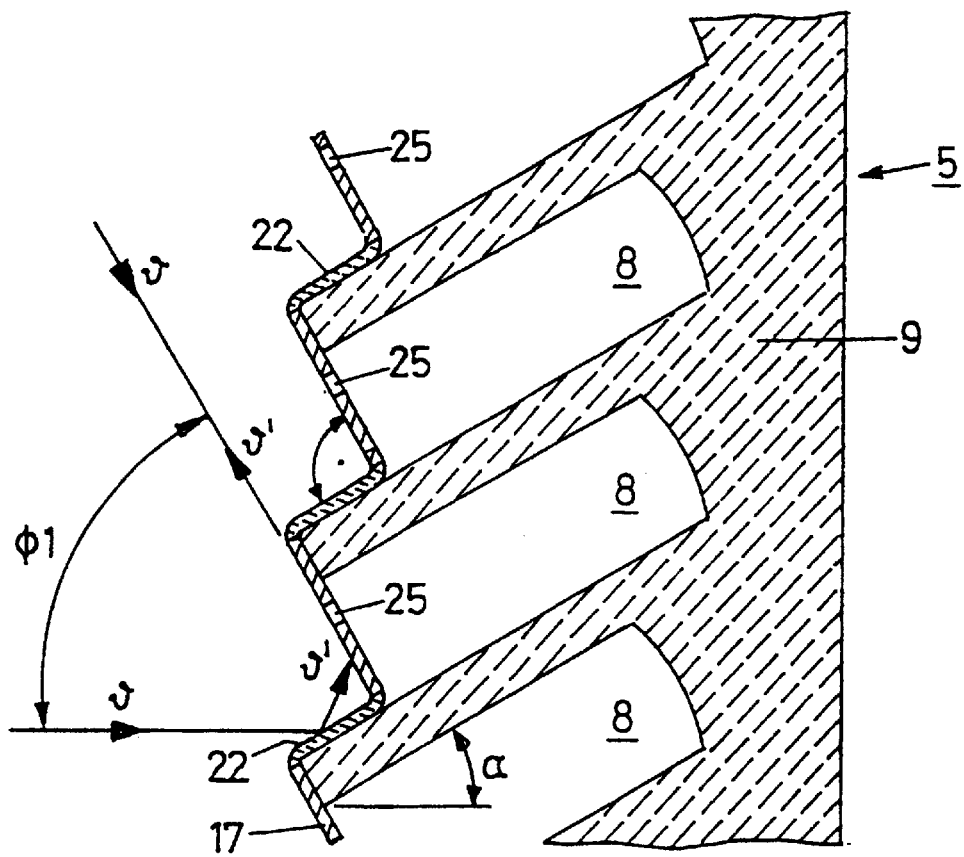
FIG. 5 shows a third variant with flat mirrors and heat-absorbing film.

A honeycomb structure 5 which is particularly easy to produce can be seen from FIG. 5. The hollow spaces 8 are again inclined by the angle α with respect to the horizontal and are closed on the sun side in a zigzag manner by a black metal film 17, with lower mirrors 22 in each case. Each hollow space 8 is provided with at least one bore 25 in the film 17 for pressure compensation.

As FIG. 5 shows, the rays incident at an angle φ1 of 45° at a high height of the sun—in central Europe—are inverted by the lower mirrors 22, while even horizontal rays v are still fed to the hollow spaces 8 as reflected radiation v'.

This embodiment allows numerous variants:

The film 17 can be used and clamped as a thin, weakly metallized film in the sense of a frequency filter; however, it can also be constructed as a thin metal sheet, have a load-bearing function, and as a passive emitter—in the manner of a relay station—to release thermal radiation of lower frequency into the hollow space 8.

This embodiment may be very expedient above all in connection with the use of unfired clay as the material for the honeycomb 5, since it gives it the necessary strength, even with widely varying atmospheric humidity. Such a honeycomb structure moreover can be permanently strengthened by polymers, which are additives known per se, and are very economical.

It has been found that unfired clay, because of its high water content, provides outstanding thermal conduction, and that the desired vapour diffusion functions outstandingly in both day and night phases. When designing the entire construction with a honeycomb structure, heat insulation and storage elements, one must be ensure that no vapour barriers are incorporated and that the vapour diffusion of the entire construction is accommodated, taking into account the most extreme local weather conditions, such that no dew can form in it. The high storage capacity of clay also serves as a type of "buffer" in the construction.

Figure 6:
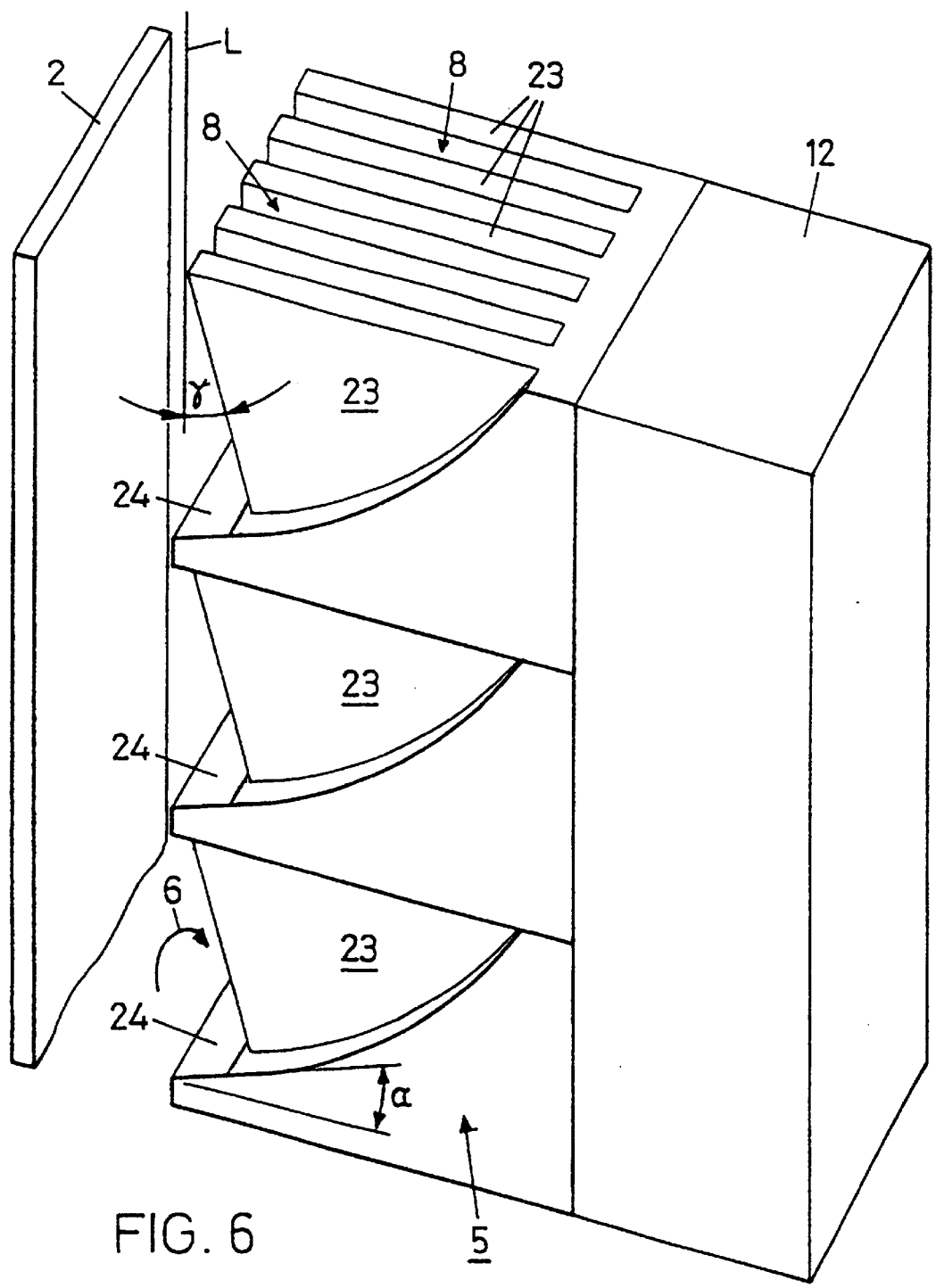
FIG. 6 shows a slit-like honeycomb.
Figure 7:
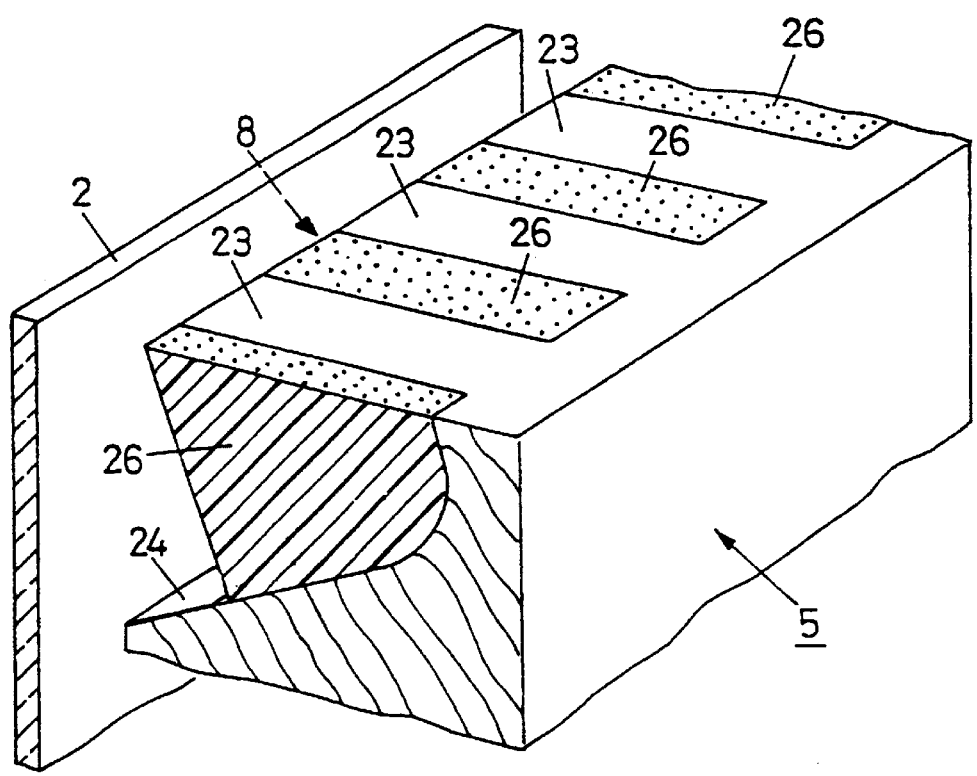
FIG. 7 shows a slit-like honeycomb with inserted heat insulation material.

In contrast, the variants according to FIG. 6 and 7 use wood for the honeycomb structure 5 and are also particularly suitable for the rustic sector because of their simple production technique. Although more expensive in production terms, grain-cut wood (also called cross-grained wood; cut surface perpendicular to the fibre) is recommended since the effective storage and diffusion capacity thereof is far superior to that of longitudinally cut wood.

The hollow spaces have been created by simple milling with a disc miller and are inclined downwards by the angle α, and in front is a mounted reflector strip 24, while vertical honeycomb walls 23 are cut back by the angle γ. Behind the honeycomb structure is relatively large heat insulation 12 with a corresponding storage mass.

The arrangement according to FIG. 6 shown only with the aid of a single pane is of course repeated as often as desired in a solar cell.

FIG. 7 shows an improved storage effect for the construction of FIG. 6 by the insertion of an open-pore, opaque heat insulation 26 into the hollow spaces 8.

Figure 8:
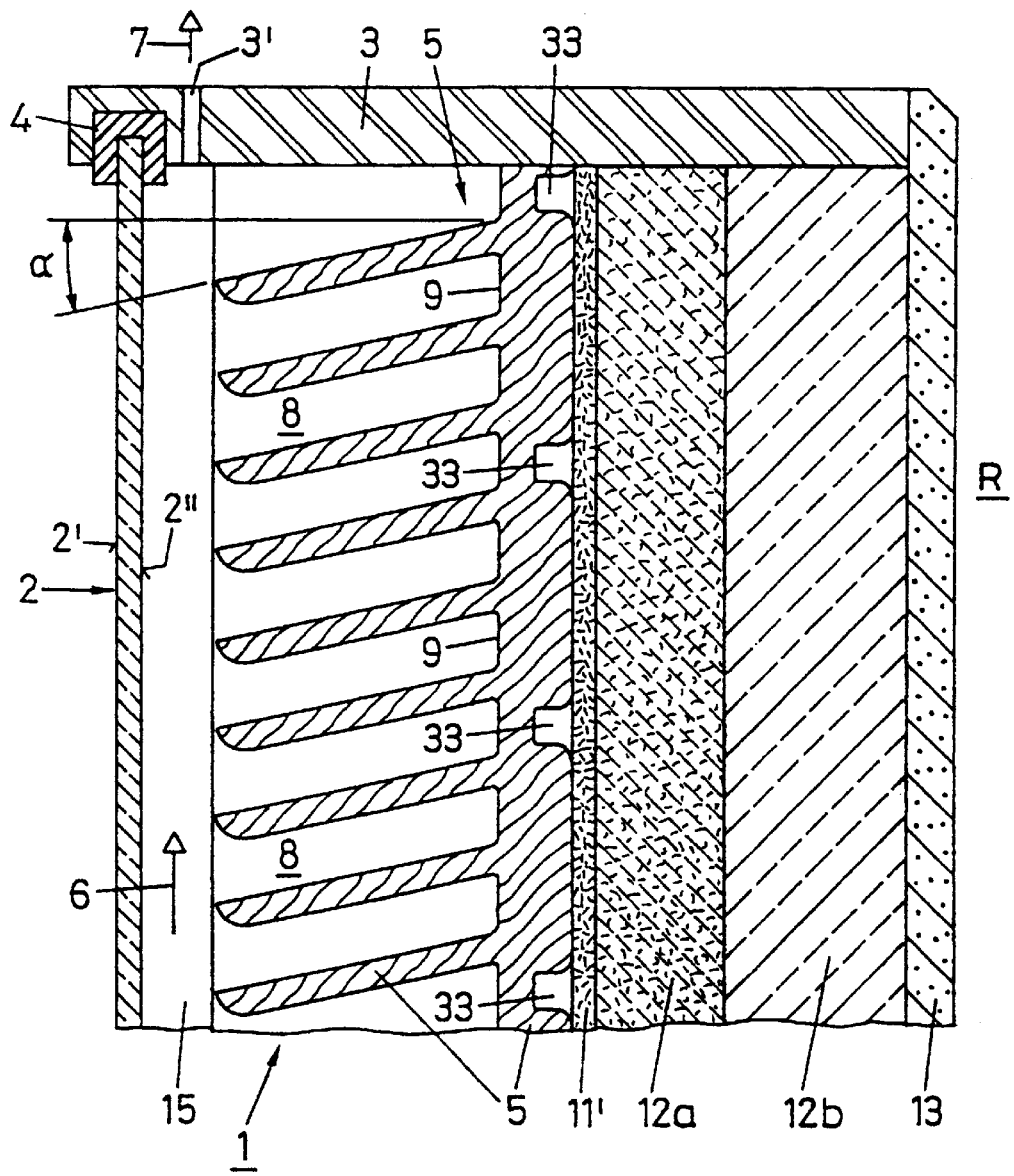
FIG. 8 shows a section of a solar cell with improved vapour diffusion and a particularly efficient second store.

FIG. 8 shows a honeycomb structure 5, with hollow spaces 8 inclined with respect to the horizontal by the angle α=15°, of spruce wood, specifically suitable for use on the north side of buildings. For improved uptake of water vapour there are continuous, horizontally running grooves 33 arranged at regular intervals on the side of the rear wall 9 facing the inside of the building.

First heat insulation 11' comprises a separating layer which is open to diffusion and acts as a compensating layer; the second insulation 12a comprises clay armoured with natural fibres (sisal, jute etc.) and has a high storage capacity both for water and in respect of the thermal capacity and gives rise to the desired high thermal time constant in connection with the subsequent heat insulation 12b of medium-density rock wool.

Figure 9:
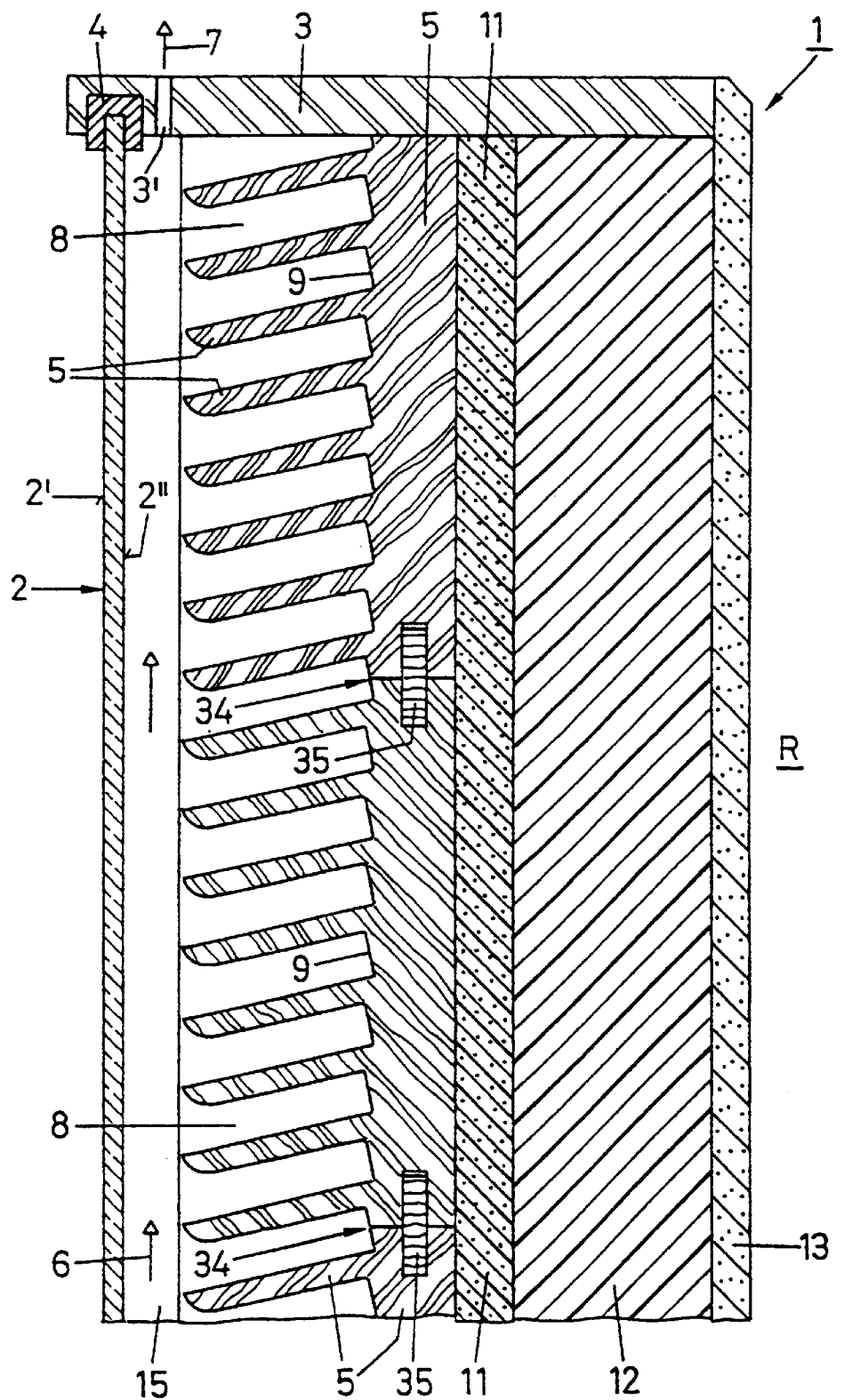
FIG. 9 shows a variant of a solar cell according to FIG. 8 with a partitioned structure.

An embodiment of the honeycomb structure 5 which can be produced particularly simply in production terms on any conventional wood-working machine can be seen from FIG. 9. The honeycomb elements are joined together by individual elements—in the way of commercially available panelling—and with tongues 35 of hardwood.

Figure 10:
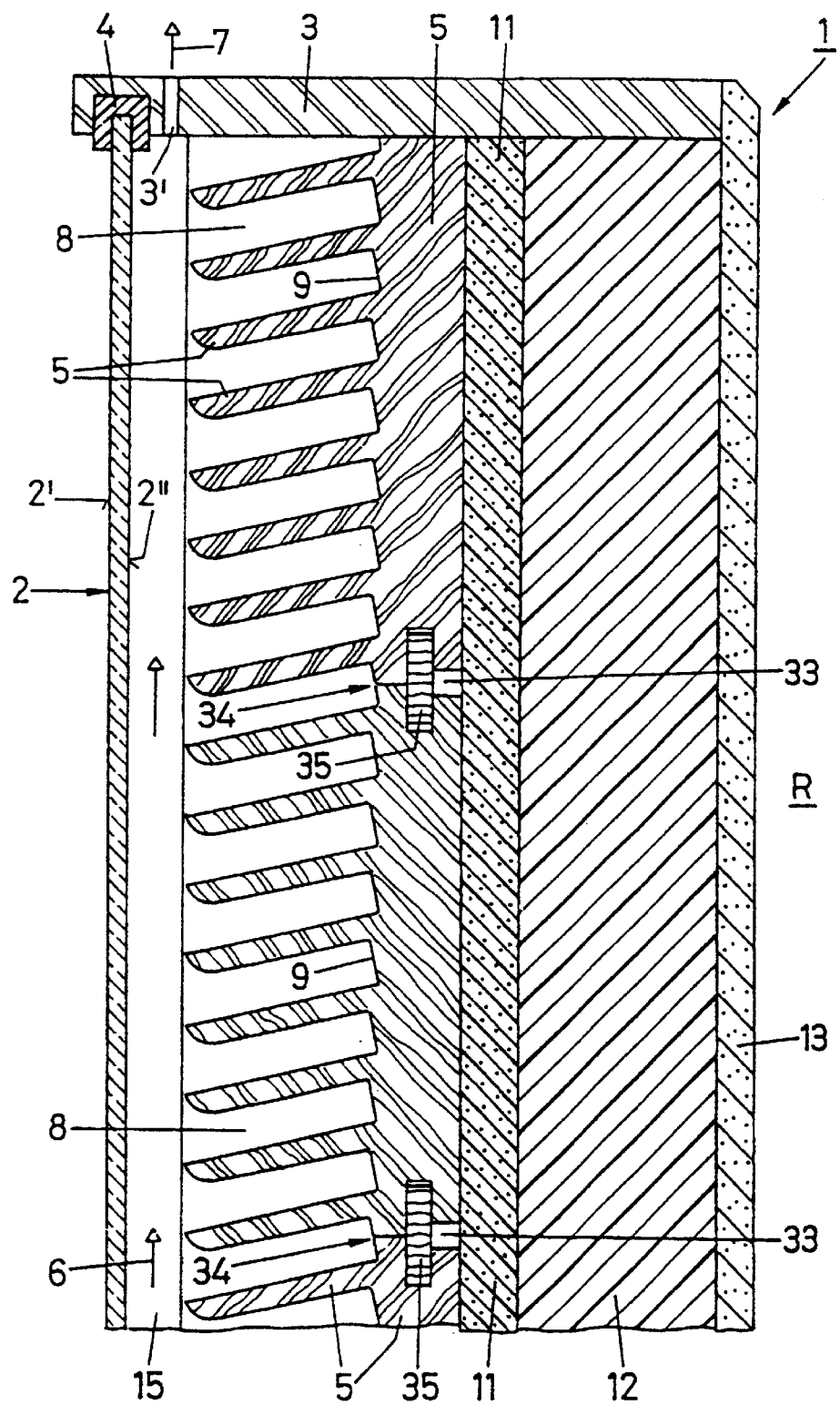
FIG. 10 and FIG. 11 show further variants, additionally with horizontal grooves for accommodation and release of vapour.

FIG. 10 is a combination of a joined-together honeycomb structure 5 according to FIG. 8, equipped with grooves 33, analogously to FIG. 9, and is particularly economical in production.

Figure 11:
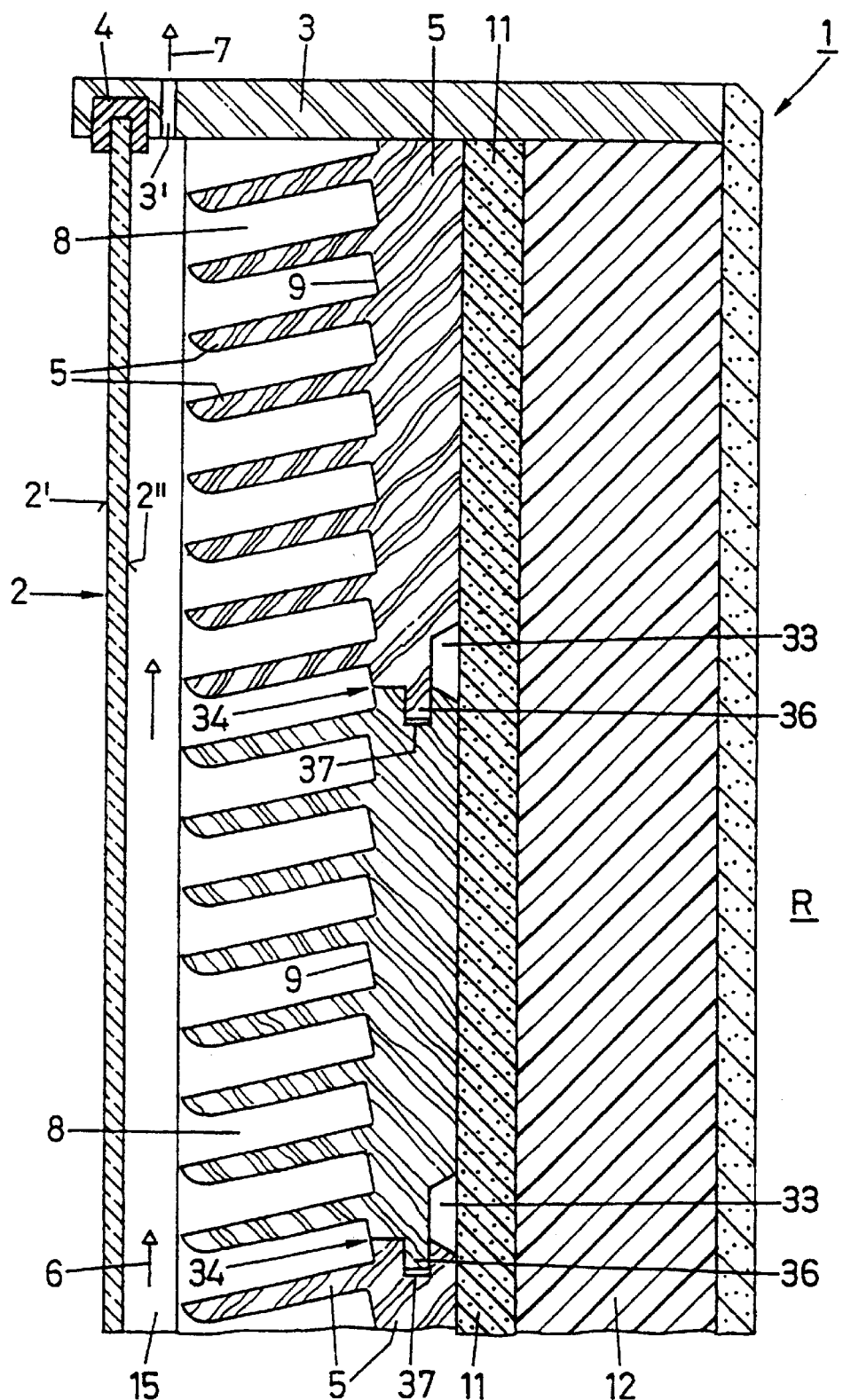

The variant according to FIG. 11 shows tongues 36 which are inserted in grooves 37, the individual elements again forming release joints 34 which promote exit of vapour. Vapour collection spaces in the form of grooves 33 which are easy to produce are likewise provided.

Figure 12:
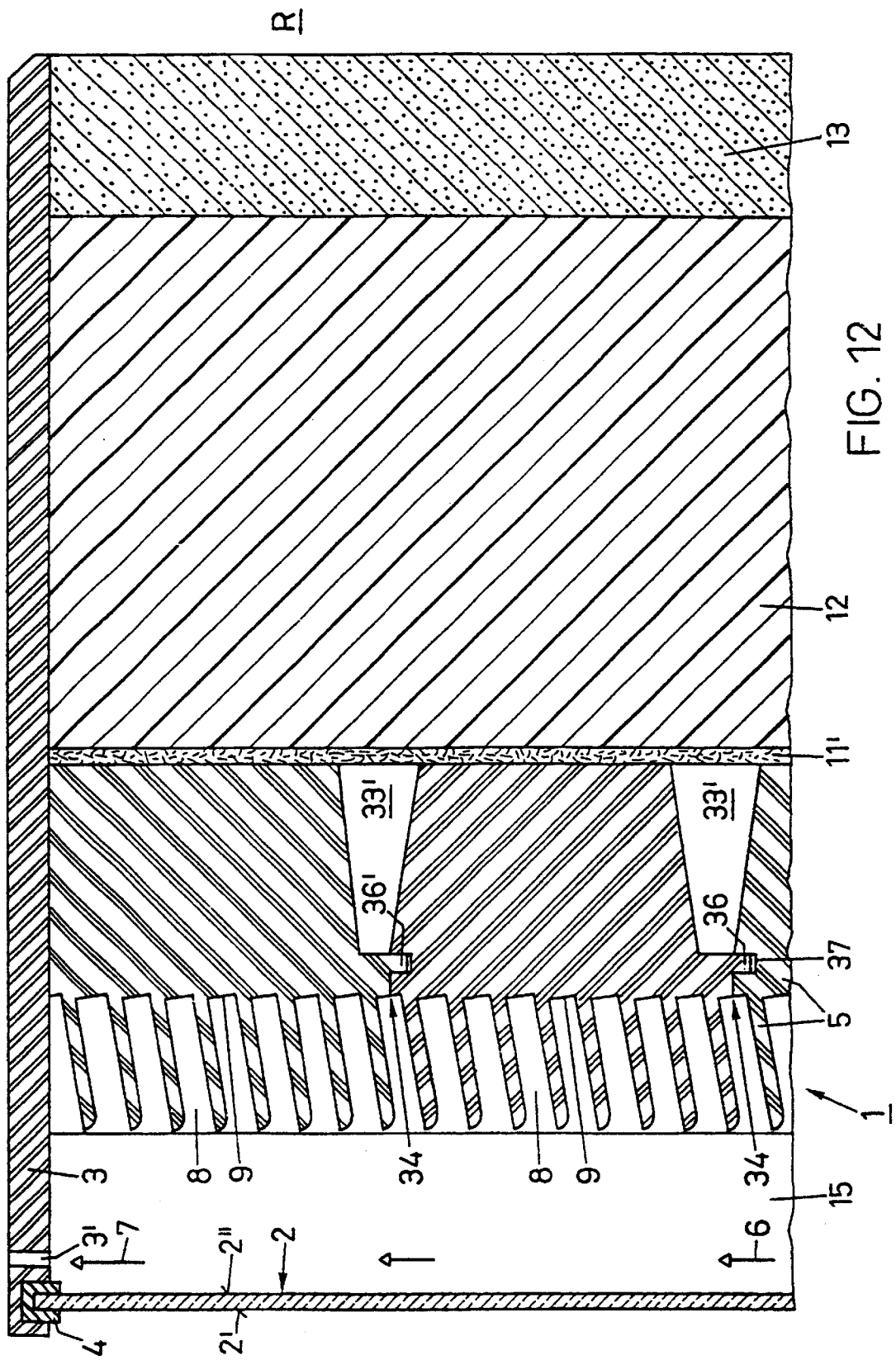
FIG. 12 shows a section of a solar cell on a scale of 1:1, particularly suitable for extreme climatic circumstances on north facades, with a first heat insulation for temperature compensation.

The embodiment of a solar cell 1 according to FIG. 12 shows particularly pronounced rear ventilation 15 with a large air volume and similarly generously dimensioned vapour collection spaces 33' constructed like a nozzle. The first heat insulation 11' here is a commercially available separating layer open to diffusion (commercial name "Permo sec", Klöber GmbH & Co. KG, A-2544 Leobersdorf), which was originally developed for elbow seam roofs and provides temperature and mass compensation within the solar cell 1.

The second heat insulation 12 comprises recycled cellulose (trade name "Fermacell", Isofloc AG, CH-9015 St. Gallen). On the room side there is in turn a gypsum plate 13 which, because of its high mass, contains a very large amount of bonded water of crystallization and further improves the heat and temperature compensation of the system. FIG. 12 is shown on a scale of 1:1.

The embodiment examples shown in FIG. 8 to FIG. 12 have covers of so-called solar glasses (OPTISOL-Therm brand, Pilkington Solar International GmbH, D-50667 Köln); in contrast to conventional use, they have their prism structure 2', FIG. 12, on the outside, while they have a smooth surface 2" on the inside.

This form of the cover 2 allows observation of the structure 5 behind by its shadow pattern and fits in with the environment in an aesthetically very pleasing manner due to its polarizing light effects.

Figure 13:
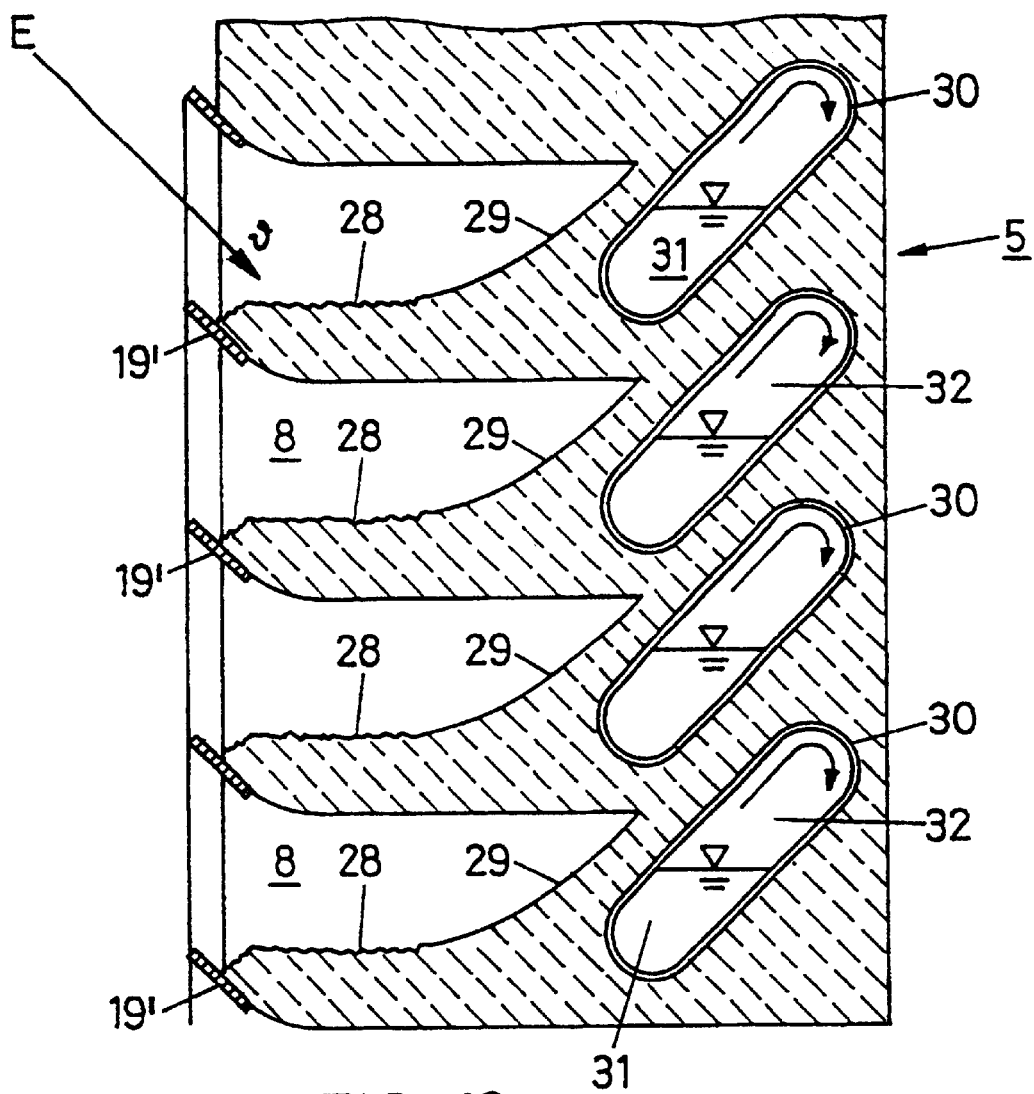
FIG. 13 shows a further honeycomb with an environment-friendly latent heat store.

The honeycomb structure 5 shown in section in FIG. 13 comprises a latent heat store of simple concept which is capable of releasing even high excesses of heat in a time-delayed manner to heat insulations and storage masses, not shown in more detail.

The honeycomb 5 with its relatively wide hollow spaces 8 has curved surfaces 28 and 29, a fluted structure being designated 28 and a smooth surface 29. Inside the ceramic honeycomb structure 5 are arranged horizontal copper pipes 30 which are tightly closed on the front side and are partly filled with a liquid 31 which vaporizes at a relatively low boiling point.

If the energy E is now irradiated into the hollow spaces 8, it is partly reflected by the mirrors arranged on the front side, i.e. the metal plates 19' inserted in the ceramic on the end side, and absorbed by the rough fluted structure 28. The cross-section of the pipes is elliptical, to utilize the honeycomb structure 5 and for thermodynamic reasons.

After a certain period of time the copper pipe 30, and successively also the liquid 31, heats up until the energy uptake thereof leads to vapour formation and to complete evaporation of the liquid.

In the night hours the reverse process now takes place. The vapour 32 starts to condense on the inside walls of the copper pipe 30 and releases its heat of evaporation to the pipes, so that the cooling phase of the honeycomb 5, in particular in its rear part, continues into the coming morning, and due to the subsequent insulating materials in the room interior, the wall temperature decreases by not more than a few tenths of a degree.

The liquid 31 can be freely chosen within wide limits, and can therefore be adapted to the system conditions. Low-boiling paraffin oils and also other non-toxic crude oil derivatives may be suitable.

Instead of a latent heat store or alternately with such stores, it has been possible to employ "heat tubes", the thermal valve action of which considerably reduces the night-time outflow of heat.

In all the embodiment examples discussed, the release of the heat taken up by the storage elements is delayed in the maxima by at least four hours. Time delays of up to twelve hours can be realized, so that day and night phases can be compensated against one another.

The individual variants discussed above can of course be combined with one another in parts or in their entirety within wide limits. The effect achieved is a common feature of all, namely that the wall and/or ceiling temperature inside a house falls only little during the night, and no troublesome, untimely introduction of heat takes place during the day. The effective room temperature can thus be kept low without losses in comfort.

Fire protection precautions can be taken and the corresponding safety regulations are to be taken into account, depending on the material used. This may be effected in a simple manner by the choice of IR reflection films and/or glasses, in particular in front of honeycomb structures of wood.

In housing estate construction and on larger buildings it is advisable to employ honeycomb structures of non-combustible materials, such as fine ceramic, clay and loam, or at least to use combinations with poorly flammable materials, in order to reduce the risk of fire.

What is claimed is:

1. A solar cell, comprising a solar collector with a transparent, rear-ventilated cover, a honeycomb structure with hollow spaces and walls which absorbs solar radiant heat located behind the cover, at least one heat insulation located behind the honeycomb structure, and at least one additional storage element for delayed release of absorbed heat into the inside of a building with which the solar cell is employed, characterized in that means are provided for permitting solar radiation at a chosen incident angle to enter the honeycomb structure and for compensating for sun-height induced incidence of radiant heat upon the honeycomb structure, the honeycomb structure, the heat insulation, and the storage element are permeable to vapor and are dimensioned such that vapor diffusion in both day and night phases is below a dew formation level, and in that the release of the heat taken up by the storage element takes place into an inside of the building with a delay from the take up time having a release maxima of at least 4 hours.

2. The solar cell according to claim 1, characterized in that the honeycomb structure has a volume ratio (V) of hollow spaces to closed volume (V2) of less than 4:1.

3. The solar cell according to claim 2 wherein the volume ratio is less than 2:1.

4. The solar cell according to claim 1 characterized in the means for permitting solar radiation at a chosen incident angle to enter the honeycomb structure and for compensating for sun-height induced incidence of radiant heat upon the honeycomb structure comprise a side of the honeycomb structure facing the sun.

5. The solar cell according to claim 1 or 4 characterized in the means for permitting solar radiation at a chosen incident angle to enter the honeycomb structure and for compensating for sun-height induced incidence of radiant heat upon the honeycomb structure comprise mirrors located on a side of the honeycomb structure facing the sun.

6. The solar cell according to claim 5, characterized in that the mirrors are flat mirrors.

7. The solar cell according to claim 5, characterized in that the mirrors are flat mirrors or spherical mirrors located to reflect radiant heat at a low height of the sun into the honeycomb hollow spaces.

8. The solar cell according to claim 7, characterized in that the mirrors are constructed bifocally.

9. The solar cell according to claim 5, characterized in that the mirrors are flat mirrors or spherical mirrors located to reflect radiant heat outwards from the honeycomb hollow spaces at a high height of the sun.

10. The solar cell according to claim 9, characterized in that the mirrors are constructed bifocally.

11. The solar cell according to claim 1, characterized in that the honeycomb hollow spaces have larger dimensions in a direction of sun height than in an orthogonal direction in at least in a side facing the sun.

12. The solar cell according to claim 11, characterized in that the honeycomb hollow spaces have on at least partial structured surface.

13. The solar cell according to claim 1, further comprising shading elements projecting over the honeycomb hollow spaces.

14. The solar cell according to claim 11, 12 or 13 characterized in that the honeycomb hollow spaces have a shape which narrows away from a side facing the sun.

15. The solar cell according to claim, 1 or 11, characterized in that the honeycomb hollow spaces are at least partly provided with an additional heat insulation.

16. The solar cell according to claim 1, characterized in that the honeycomb hollow spaces are inclined with openings directed towards the sun being lower than remaining hollow space portions.

17. The solar cell according to claim 1 or 16, characterized in that a transparent film for suppression of an exchange of air is positioned in front of the honeycomb structure.

18. The solar cell according to claim 17, characterized in that the film is a black radiation emitter having at least one perforation in a region of each honeycomb hollow space.

19. Solar cell according to claim 1, characterized in that the honeycomb structure is constructed of a fine ceramic.

20. The solar cell according to claim 1, characterized in that the honeycomb structure is constructed of wood.

21. The solar cell according to claim 20, wherein the wood is grain-cut wood.

22. The solar cell according to claim 1, characterized in that at least one of the honeycomb structure and the at least one heat insulation is made of unfired clay or gypsum, armored with natural fibers and/or with polymeric additives.

23. The solar cell according to claim 1 characterized in that the heat insulation is permeable to radiation.

24. The solar cell according to one claim 1 characterized in that the transparent cover has a structured outer surface facing the sun and an inner smooth surface.

* * * * *